No. 622,689. Patented Apr. 11, 1899.
J. C. HOWELL.
PROCESS OF MAKING BATTERY ELECTRODES.
(Application filed Jan. 3, 1899.)
(No Model.)
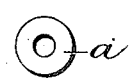
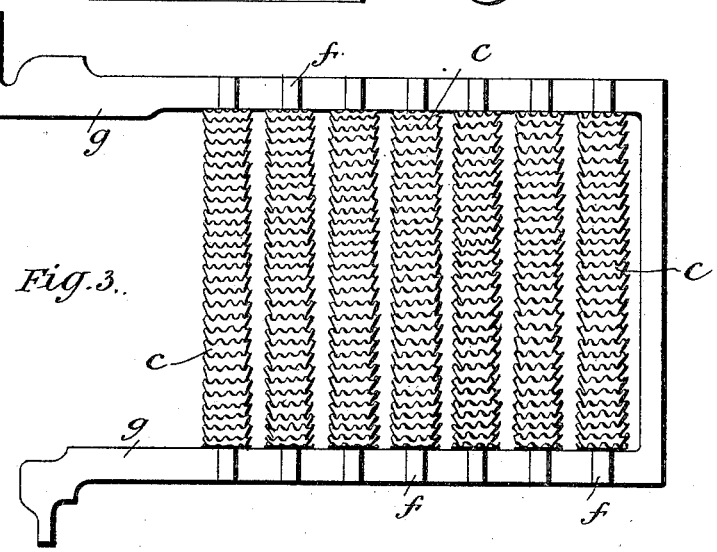
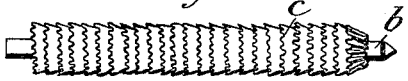
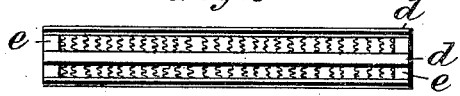
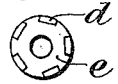
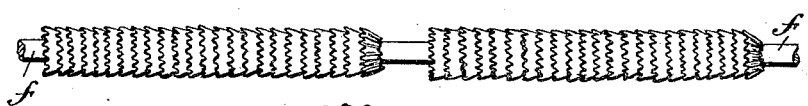
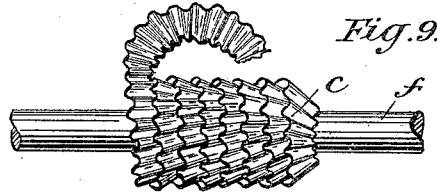
WITNESSES.
INVENTOR.
John Charles Howell

UNITED STATES PATENT OFFICE.

JOHN CHARLES HOWELL, OF LONDON, ENGLAND, ASSIGNOR TO THE POROUS ACCUMULATOR COMPANY, LIMITED, OF SAME PLACE.

PROCESS OF MAKING BATTERY-ELECTRODES.

SPECIFICATION forming part of Letters Patent No. 622,689, dated April 11, 1899.

Original application filed July 8, 1898, Serial No. 685,449. Divided and this application filed January 3, 1899. Serial No. 701,041. (No specimens.)

*To all whom it may concern:*

Be it known that I, JOHN CHARLES HOWELL, a subject of the Queen of Great Britain, residing at London, England, have invented an Improved Process of Making Battery-Electrodes, of which the following is a specification.

The subject-matter of this application was fully disclosed and claimed in my prior application, Serial No. 685,449, filed July 8, 1898, of which this application is a division, made under the requirements of the Office.

This invention relates to a form of spiral-wound metallic ribbon particularly adapted for forming secondary battery plates or electrodes, but useful also for other purposes, such as for primary batteries or for other uses where it is desired to produce an extended surface for a given weight of metal. The invention being described for use in a secondary battery, its application for other purposes will be evident.

It has long been known that to provide for economical working in electrolytic cells when heavy currents are employed the electrodes should present as large a surface as possible to the electrolyte, but great difficulties have been encountered in getting this extended surface without impairing the electrical continuity and the mechanical strength of the electrode. According to this invention such extended surface is obtained by so coiling and spacing a metallic ribbon that it becomes a plain or crinkled spiral, with a central hole therethrough in which a core can be cast, making close electrical contact with the interior edges of the ribbon or external strips, or a surrounding tube perforated or not may be employed and the core omitted. A number of such coils can be connected to a metallic frame, so as to form a plate of any desired dimensions or each coil may form an electrode of itself.

To clearly explain the invention, reference is made to the accompanying drawings, in which—

Figure 1 is a side elevation of a metal tube from which the ribbon is to be made. Fig. 2 is an end view of same. Fig. 3 represents a battery-plate formed of seven coils of spiral ribbon and a surrounding framework. Fig. 4 is a side elevation of the way the ribbon appears when wound upon a mandrel. Fig. 5 is an end elevation of same. Fig. 6 shows the ribbon when held in position by external strips. Fig. 7 is an end view of same. Fig. 8 shows in side elevation two lengths of spiral ribbon mounted upon a common core, and Fig. 9 represents upon a larger scale a view of a short length of such ribbon upon a core.

One method by which such coils suitable for accumulator purposes can be obtained is to fix a lead or other suitable metallic tube $a$ to a mandrel which can be revolved and to place across the end of the tube an acute-angled knife or cutter which can be advanced in a direction parallel to the axis of the tube at rates which can be varied, say, from one-hundredth of an inch to one six-hundredth of an inch to one revolution of the tube. The rate of feed as between the knife and tube will depend upon the metal to be cut and upon whether a plain or crinkled spiral is to be produced. As the tube is cut a ribbon of metal is produced which tends to curl around a second mandrel $b$, arranged in line with the first mandrel, but independently rotated, as is more fully described in my application, Serial No. 701,042, filed January 3, 1899, which shows and describes one form of apparatus for carrying out this process. This mandrel may be made to be rotated or not and can be withdrawn as the length of the coil increases. The character of the coil so produced depends upon the amount of the second mandrel's rotation and the extent of its withdrawal, if the coil is attached to it, as compared with the length of ribbon produced.

If the rotation or withdrawal of the second mandrel be such that the coil be wound thereon without what may be called "back pressure," the surfaces of the metal spirals will be comparatively smooth, while if the mandrel $b$, taking up the coil, has a slower rotation or withdrawal the ribbon $c$ is crinkled or bent to and fro upon itself, as most clearly seen in Fig. 9, thus producing a series of spaces or interstices between the coils which will permit a comparatively free access of the electrolyte to all parts of the coil. The ribbon c so coiled can be supported by external strips d and end pieces e or by a surrounding perforated pipe, (not shown;) but it will generally be found preferable to mount them on cores f, and a number of such cores carrying the ribbon c can be formed into a battery-plate by casting or otherwise securing a frame g to such cores.

It has hitherto been proposed to use perforated and recessed plates of various kinds for battery-work, and also it has been proposed to have a core with a screw-thread or worm around it, and also it has been proposed to mount a series of separate washers of various forms upon a core; but so far as it is believed no one has heretofore proposed to produce a continuous spiral ribbon from a single tube and mount such ribbon upon a core or frame, securing continuity of metallic contact and an extended metallic surface.

What is claimed is—

1. The process of producing battery-electrodes which consists in first spirally cutting a metallic tube in the direction of its length, and then winding the continuous ribbon so produced upon a core or mandrel, substantially as described.

2. The process of producing battery-electrodes of waved or crinkled ribbon which consists in first spirally cutting a metallic tube in direction of its length and then winding the continuous ribbon so produced upon a core or mandrel rotating with less surface speed than the tube, substantially as described.

3. The process of producing battery plates or electrodes which consists in first spirally cutting a metallic tube in the direction of its length and then securing the continuous ribbon so produced upon or to a core or frame, substantially as described.

In testimony whereof I have hereunto set my hand in the presence of two subscribing witnesses.

JOHN CHARLES HOWELL.

Witnesses:
PHILIP M. JUSTICE,
ALLEN PARRY JONES.